US 8,126,858 B1

(12) United States Patent
Ruzon et al.

(10) Patent No.: US 8,126,858 B1
(45) Date of Patent: Feb. 28, 2012

(54) SYSTEM AND METHOD FOR DELIVERING CONTENT TO A COMMUNICATION DEVICE IN A CONTENT DELIVERY SYSTEM

(75) Inventors: Mark A. Ruzon, Mountain View, CA (US); Keshav Menon, Sunnyvale, CA (US); Gurumurthy D. Ramkumar, Palo Alto, CA (US); Donald Tanguay, Sunnyvale, CA (US); Supratik Bhattacharyya, Mountain View, CA (US); Gautam Bhargava, Palo Alto, CA (US)

(73) Assignee: A9.com, Inc., Palo Alto, CA (US)

( * ) Notice: Subject to any disclaimer, the term of this patent is extended or adjusted under 35 U.S.C. 154(b) by 627 days.

(21) Appl. No.: 12/284,180

(22) Filed: Sep. 19, 2008

Related U.S. Application Data

(63) Continuation of application No. 12/009,959, filed on Jan. 23, 2008, now abandoned.

(51) Int. Cl.
*G06F 7/00* (2006.01)
*G06F 17/00* (2006.01)

(52) U.S. Cl. ........ 707/694; 707/706; 707/769; 707/770; 709/219; 709/223; 709/225; 725/41; 725/62

(58) Field of Classification Search .................. 707/706, 707/769, 770, 694; 709/219, 223, 225; 725/41, 725/62
See application file for complete search history.

(56) References Cited

U.S. PATENT DOCUMENTS

| | | | | |
|---|---|---|---|---|
| 7,149,797 B1 * | 12/2006 | Weller et al. | .......... | 707/E17.032 |
| 7,765,231 B2 * | 7/2010 | Rathus et al. | .................. | 707/783 |
| 7,812,986 B2 * | 10/2010 | Graham et al. | ............ | 379/88.14 |
| 7,818,215 B2 * | 10/2010 | King et al. | .................... | 382/229 |
| 2003/0009568 A1 * | 1/2003 | McIntyre | ....................... | 709/229 |
| 2003/0012403 A1 * | 1/2003 | Rhoads et al. | ................. | 382/100 |
| 2006/0227992 A1 * | 10/2006 | Rathus et al. | .................. | 382/100 |
| 2006/0282288 A1 * | 12/2006 | Rodriguez et al. | ................. | 705/2 |
| 2007/0172155 A1 * | 7/2007 | Guckenberger | ................... | 707/6 |
| 2008/0010372 A1 * | 1/2008 | Khedouri et al. | ............. | 709/224 |
| 2008/0195664 A1 * | 8/2008 | Maharajh et al. | .......... | 707/104.1 |
| 2010/0166309 A1 * | 7/2010 | Hull et al. | ...................... | 707/769 |

OTHER PUBLICATIONS

Bertrand Le Saux and Giuseppe Arnato—"Image Recognition for Digital Libraries"—MIR'04— Proceedings of the 6th ACM SIGMM International Workshop on Multimedia Information retrieval—2004 ACM (pp. 91-98:1-8).*

Frost et al.—"Browser and Search Patterns in a Digital Image Database"—Information Retrieval, (SpringerLink) vol. 1, No. 4 (pp. 287-313:1-27).*

* cited by examiner

*Primary Examiner* — John E Breene
*Assistant Examiner* — Anh Ly
(74) *Attorney, Agent, or Firm* — Novak Druce + Quigg LLP

(57) ABSTRACT

The present invention relates to a method, system, and a computer-readable storage medium containing executable instructions for delivering content to a communication device, in response to an image sent by the communication device. The received image is matched with a plurality of images, and, when a match is found for the received image, content corresponding to the matching image is delivered to the communication device. The plurality of images is stored in an image database, and the corresponding content is stored in a content repository. The present invention enables a content provider to automatically update the image database and the content repository without any human intervention.

22 Claims, 3 Drawing Sheets

SYSTEM AND METHOD FOR DELIVERING CONTENT TO A COMMUNICATION DEVICE IN A CONTENT DELIVERY SYSTEM

CROSS REFERENCE TO RELATED APPLICATION

This application is a continuation of application Ser. No. 12/009,959 filed Jan. 23, 2008 now abandoned.

BACKGROUND OF THE INVENTION

The present invention relates in general to modifying a database of images and a content repository in a content delivery system. In particular, the invention relates to the process of enabling a content provider to automatically modify the database of images, the content repository, and the correspondences between images and content in the content delivery system without human intervention.

Typically, a content delivery system enables the user of a communication device to obtain content related to an image the user has captured through a camera of the communication device. For example, if the user of the communication device captures an image of a movie poster through the camera of the communication device, and sends the captured image to the content delivery system, the content delivery system sends the user content related to the movie. This content can be, for example, a text message containing the plot of the movie, an audio clip from the movie's soundtrack, a still image of a scene from the movie, a video clip containing the movie's trailer, etc. In another scenario, a user of the communication device may come across an image on the Internet and may want to get information related to the image. For example, a user finds an image of a solar flare released by National Aeronautics and Space Administration (NASA) and is interested in getting all the content available from NASA related to the solar flares. The content can include causes of solar flares, their classifications, hazards, etc.

Conventionally, to deliver content related to the image it receives from the communication device, the content delivery system matches the image with all the images stored in its image database. The image database can store thousands of images from magazines, posters, newspapers, the Internet, etc. For example, the image database can store the images of wall posters and billboard advertisements corresponding to a particular movie 'X'. In addition, the content repository can, for example, store a text summary of the plot of movie 'X'. Consequently, when the content delivery system receives the image of the poster of the movie 'X' from a communication device, it matches the received image with all the images stored in its image database. When the content delivery system determines that the received image matches the image of a wall poster of movie 'X', it sends the text summary of the plot of movie 'X' to the communication device. However, if the image sent by the communication device is not of a wall poster or billboard advertisement of movie 'X', the content delivery system is not able to match the received image with any of the images. In this event, the content delivery system sends a response, such as a text message saying, "No information available for the image" to the communication device.

The content delivery system is more useful if it can be adapted over time to meet the changing requirements of content providers. For example, a movie studio may develop new posters after the initial posters have been completed, or it may wish to change the content that is to be delivered for a particular movie poster. In order to provide this flexibility, the content delivery system needs to allow changes to the image database, the content repository, and the rules mapping images to content.

Active human involvement is required in conventional content delivery systems to regularly update the image database. For example, content providers need to first send the latest images and the content to the administrators of the content delivery system. Thereafter, a person has to manually update the image database by adding the new images and content. This process of manually updating the image database and content repository causes unnecessary delay or waste of labor, since the person involved in updating the image database can be more profitably utilized for other useful work. Also, a manual process may allow errors to occur through miscommunication or other factors.

In light of the foregoing, there is a need for a method and system that can resolve the limitations mentioned above.

SUMMARY OF THE INVENTION

An object of the present invention is to provide a method and system for enabling a content provider to automatically create and modify the image database, content repository, and rules mapping images to content in a content delivery system. The present invention enables the content provider to add or delete any image or content or change any rule in the content delivery system without human intervention.

Various embodiments of the present invention provide a method and system for delivering content to a communication device in response to an image sent by the communication device. The system includes a recognition system that determines whether the image received from the communication device matches any image in an image database. This image database and the associated content repository can be regularly updated with the latest images and content by a content provider. The system also includes a transaction interface that receives the image from the communication device and delivers the associated content to the communication device when the recognition system determines a match. Further, the system includes a database interface that enables the content provider to directly update the image database, the content repository, and the rules mapping images to content without any human involvement.

BRIEF DESCRIPTION OF THE DRAWINGS

The embodiments of the present invention will hereinafter be described in conjunction with the appended drawings that are provided to illustrate and not to limit the present invention, wherein like designations denote like elements, and in which.

DETAILED DESCRIPTION OF THE INVENTION

Various embodiments of the present invention provide a method and system for a content delivery system delivering content to a communication device in response to an image sent by the communication device. The delivered content is related to the image in the image database that matches the image sent by the communication device. The system also includes a transaction interface that receives the image from the communication device and delivers content to the communication device. To make this process more flexible, the system includes a database interface that enables a content provider to automatically update the image database, the content repository, and the rules mapping images to content without any human involvement.

Figure 1:
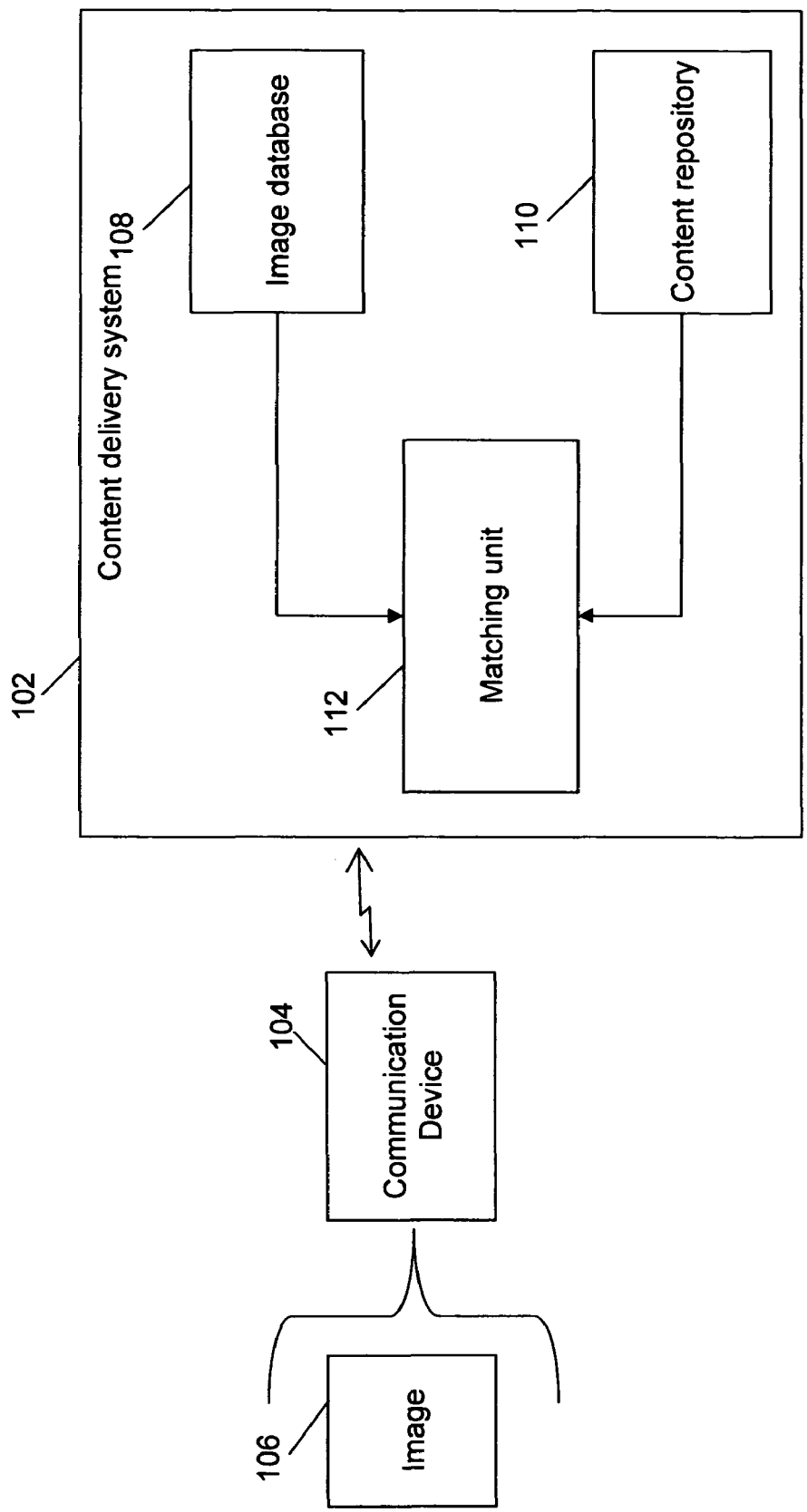
FIG. 1 is a block diagram illustrating an exemplary content delivery system, wherein various embodiments of the present invention can be practiced.

FIG. 1 is a block diagram illustrating a content delivery system 102, wherein various embodiments of the present invention can be practiced. Content delivery system 102 communicates with communication devices such as a communication device 104 that has a camera (not shown) attached to it. In another case, the communication device 104 may not have a camera attached to it, but may be capable of receiving and transmitting images and media content. In accordance with an embodiment of the invention, communication device 104 is a mobile communication device, like a mobile phone, a personal digital assistant (PDA), or any other wireless communication device. In accordance with another embodiment of the invention, communication device 104 can be a personal computer or a laptop.

Communication device 104 captures images through its camera and sends them to content delivery system 102. These captured or received images can include the images of a particular product, a newspaper article, a movie poster, or any other image that can be captured through the camera of communication device 104 or can be received at communication device 104. Content delivery system 102 provides content relating to the received images to communication device 104. Examples of such content include text messages, still images, video clips, audio clips, audio-visual clips, etc.

Typically, to obtain content about a certain product, the user of communication device 104 captures the image of the product through the camera of the device and sends the image to content delivery system 102. For example, the user of communication device 104 may be interested in knowing the plot of a certain movie 'X'. To get this information, the user captures an image 106 of a poster of movie 'X' through the camera of communication device 104 and sends it to content delivery system 102.

Similarly, a user of communication device 104 may want to get content related to solar flares or related to a particular book while reading about it on the Internet. The user of communication device 104 stores the image of a solar flare or an image of the cover page of the book and sends it to the content delivery system 102.

When image 106 is received by content delivery system 102, content delivery system 102 matches received image 106 with all the images stored in an image database 108. Image database 108 stores a plurality of images from the content provider, and the corresponding content for each image is stored in content repository 110. For example, image database 108 can store images of different marketing materials of the movie 'X', while content repository 110 can store a text summary of the plot of movie 'X'. In this example, the content provider can be a movie studio which has produced or holds copyrights of the movie. Images of movie 'X' can be, for example, captured pictures from newspaper articles, posters, magazine advertisements, and the like. When received image 106 matches any of the images in image database 108, content delivery system 102 retrieves the text summary of the plot of movie 'X' from content repository 110 and sends it to communication device 104. Similarly, when the user of communication device 104 sends the image found on the Internet, say an image of solar flares or the cover page of a book, content delivery system 102 sends the relevant content about solar flares or the book to communication device 104. With respect to this example, the content provider can be NASA in the case of solar flares and the publishing house in the case of the book.

To match received image 106 with all the images in image database 108, matching unit 112 matches image 106 with all the images in image database 108. Once a match has been found for image 106, matching unit 112 determines the corresponding content associated with image 106 and sends the content from content repository 110 to communication device 104.

Figure 2:
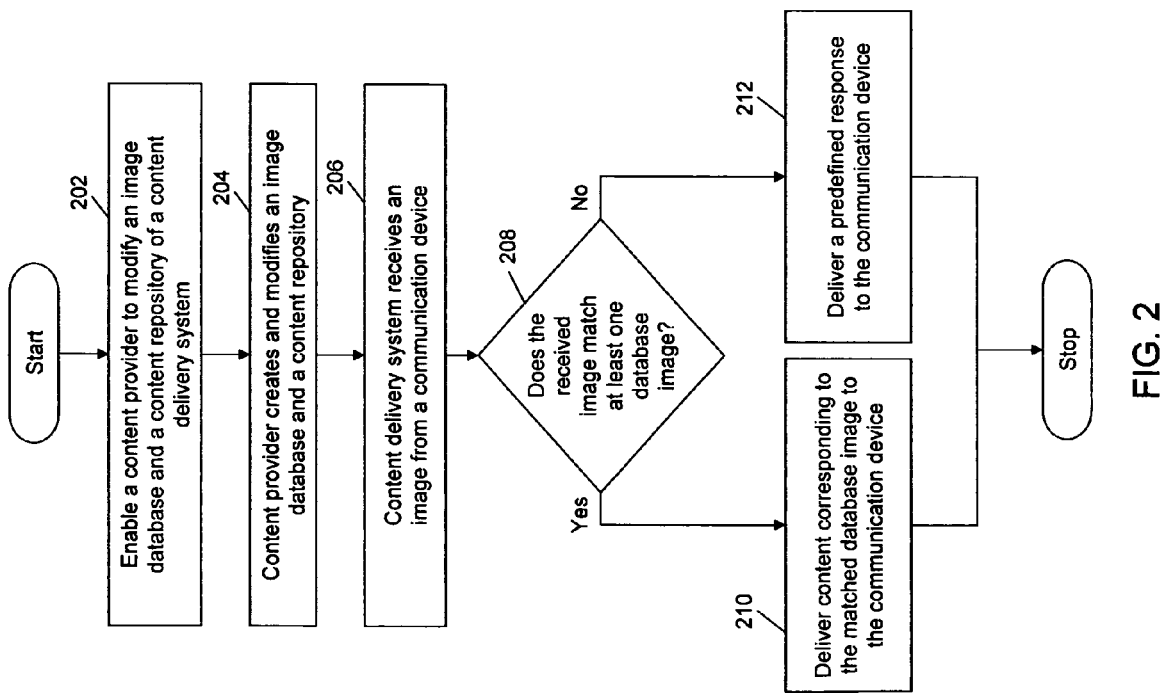
FIG. 2 is a flowchart illustrating the steps for managing a content delivery system, in accordance with an embodiment of the present invention.

FIG. 2 is a flowchart illustrating the steps for managing content delivery system 102, in accordance with an embodiment of the present invention. As explained in FIG. 1, content delivery system 102 delivers content from content repository 110 to communication device 104 in response to image 106 which is sent by communication device 104 to content delivery system 102.

At step 202, the content provider is given authority to access content delivery system 102. As mentioned in FIG. 1, content delivery system 102 contains an image database 108 which stores a plurality of images, and a content repository 110, which contains the content to be delivered. For example, image database 108 can store a plurality of images of a certain product 'A' or about solar flares, while content repository 110 can store a text message containing links to merchants selling product 'A' or information about different classifications of solar flares and their hazards. In accordance with an embodiment of the present invention, the content provider automatically creates image database 108, to store the plurality of images. Further, the content provider automatically creates content repository 110 to store the content related to these images. A content provider may choose to create multiple pairs of image databases and content repositories, so that each may be accessed by a separate logical address. Those skilled in the art will appreciate that the term "automatically" in the present context means "without requiring manual intervention from an operator or administrator of the content delivery system". It does not signify that the image database or the content repository can be created or operated independently without requiring any manual intervention from the content providers. In the present scenario, the content provider can update the image database and the content repository directly, without any manual intervention from the content delivery system.

At step 204, a content provider automatically creates and modifies image database 108 and content repository 110 without any other human intervention. For example, the manufacturer of product 'A' can change the list of merchants in the text message in content repository 110. The manufacturer can add new images of product 'A' to image database 108 or delete existing images from image database 108.

In accordance with an embodiment of the present invention, content delivery system 102 enables the content provider to create a new image database within image database 108. For example, if the content provider is a movie studio 'ABC', and it releases its latest movie 'Y', it can create a new image database and content repository with the name 'Movie Y, Studio ABC' to store the images of the movie 'Y' in image database 108 and a text summary of the plot in content repository 110. Apart from the plot of the movie, the studio ABC can also add a ringtone from the soundtrack in the newly formed content repository. In this case, the studio ABC also specifies the mapping from images to content in image database 108 and content repository 110. In other words, the studio ABC specifies the content that needs to be delivered, corresponding to the images in the image database for 'Movie Y, Studio ABC'. For example, the studio ABC can specify that if the received image 106 matches some subset of images in the image database 'Movie Y, Studio ABC', content delivery system 102 should deliver a ringtone, while for some other subset of images in the image database 'Movie Y, Studio ABC', content delivery system 102 should deliver a text summary of the plot of movie 'Y' to communication device 104.

In accordance with another embodiment of the present invention, content provider 102 can modify an existing image database within image database 108. For example, if studio ABC has already created the image database 'Movie Y, Studio ABC' in image database 108, the studio ABC can add another image to the database 'Movie Y, Studio ABC'. The studio ABC can also modify the content relating to these images within content repository 110. For example, the studio ABC can change the text summary of the plot of movie 'Y' in the image database 'Movie Y, Studio ABC'. It can also add new content corresponding to the images in the content repository for 'Movie Y, Studio ABC'. For example, the studio ABC can add another ringtone from the soundtrack of movie 'Y' or mobile phone wallpaper to the content repository for 'Movie Y, Studio ABC'.

In accordance with yet another embodiment of the present invention, the content provider can remove an image from the existing image database or content related to an image from the existing content repository. Continuing with the example of the previous paragraph, the studio ABC can delete the image database and content repository of movie 'Y' when its theatrical release has ended.

Content delivery system 102 can log information about each request received, such as the actual image sent by communication device 104, the time the request was received, the image in image database 108 that was matched (if any), and a unique identifier such as a phone number or e-mail address belonging to communication device 104. Studio ABC can then track interest in movie 'Y' by asking content delivery system 102 to generate a transaction report that aggregates the information that was logged in different ways. For instance, Studio ABC may check how many times the same unique identifier appears in multiple requests, or the number of requests over the last week or month, or how well each image in image database 108 is matched by the images sent by communication devices.

At step 206, an image is received by content delivery system 102 from communication device 104. For the sake of clarity, the received image can be assumed to be image 106 captured and sent by communication device 104 of a poster of movie 'X', an image of solar flares, or the cover page of a book, The user of communication device 104 sends image 106 to content delivery system 102 to obtain content related to movie 'X'. The content can be, for example, a text summary of the plot of the movie, a video clip with the movie's trailer, a ringtone from the movie's soundtrack, information about the hazards of solar flares, a summary of the book, or information about the author of the book, etc.

At step 208, content delivery system 102 determines whether the received image 106 matches any of the images in image database 108. As explained in FIG. 1, content delivery system 102 uses matching unit 112 to determine a match for the received image 106. Continuing with the example in the previous paragraph, image 106 is of a poster of movie 'X' and matching unit 112 compares image 106 to all the images in image database 108 to see if a match is found.

At step 210, content corresponding to the received image 106 is delivered to communication device 104 when a match has been found for the received image 106. For example, if image 106 is of a poster of the movie 'X', and matching unit 112 is able to find an image of the same poster in image database 108, matching unit 112 retrieves the associated content from content repository 110 and delivers the associated content about movie 'X' to communication device 104. As mentioned earlier, the content to be delivered to communication device 104 is specified by the content provider storing the images of movie 'X' in image database 108. In the case of image 106, the content provider is the movie studio producing movie 'X' or NASA or the publishing house of the book.

However, if a match is not found for received image 106, then at step 212, a predefined response is sent to communication device 104. For example, if image 106 is not an image of the poster of movie 'X' in image database 108, matching unit 112 will not find any match for image 106. In this case, content delivery system 102 can send a text message saying, "Sorry. No information available for the image sent by you" to communication device 104.

Figure 3:
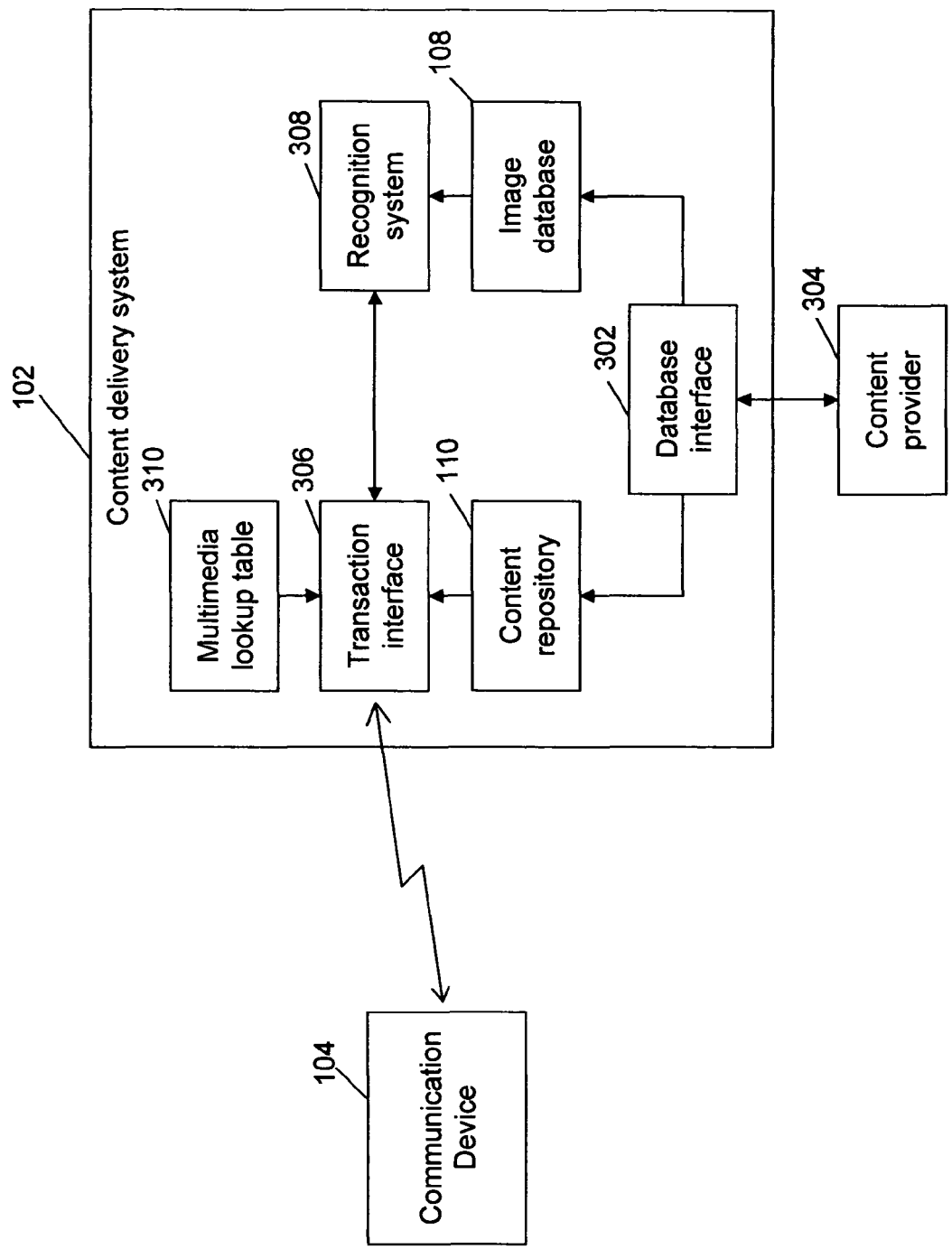
FIG. 3 is a block diagram illustrating a content delivery system, wherein various embodiments of the present invention can be practiced.

FIG. 3 is a block diagram illustrating content delivery system 102, wherein various embodiments of the present invention can be practiced. Content delivery system 102 includes a database interface 302 that enables a content provider 304 to automatically modify image database 108 and content repository 110 of content delivery system 102.

Database interface 302 enables content provider 304 to automatically create a new image database 108 and content repository 110, and later modify the existing image database or content repository. The concept of modifying or creating image database 108 and content repository 110 has already been explained in FIG. 2. Content delivery system 102 also includes a transaction interface 306 that receives image 106 from communication device 104 and sends content to communication device 104. As already explained in the previous figures, the user of communication device 104 captures image 106 through the camera of communication device 104. Alternatively, users of communication device 104 encounter an image while browsing the Internet. Thereafter, users of communication device 104 send image 106 to content delivery system 102 to obtain content related to the image. For example, image 106 can be of a poster of movie 'X', an image of solar flares, or an image of the cover page of a book. The users of communication device 104 may be interested in knowing the plot of the movie, information about hazards of solar flares, or information about the author of the book. In this case, the user sends image 106 to content delivery system 102. The user can send image 106 via electronic mail (email), Multimedia Messaging Service (MMS), Hypertext Transfer Protocol (HTTP), or some other communications protocol.

Thereafter, image 106 is received by transaction interface 306 of content delivery system 102, which interface sends image 106 to recognition system 308. In accordance with an embodiment of the present invention, transaction interface 306 and recognition system 308 are combined to form matching unit 112, as described in FIG. 1.

As shown in FIG. 3, recognition system 308 is connected to image database 108, which stores a plurality of images. When image 106 is received by recognition system 308 from transaction interface 306, recognition system 308 matches image 106 with the plurality of images stored in image database 108. For example, if image 106 is of a poster of movie 'X', recognition system 308 searches for an image of the same poster in image database 108. When recognition system 308 finds a match for image 106, it returns the match to transaction interface 306, which retrieves the corresponding content from content repository 110. For example, transaction interface 306 can retrieve the video clip of the trailer of movie 'X' when recognition system 308 is able to match the image of the poster of movie 'X' in image database 108 with received image 106. Transaction interface 306 then searches multimedia lookup table 310 to determine the correct format for any audio and video data to be sent to communication device 104 based on the particular brand and model of the device. Transaction interface 306 then sends the video clip of the trailer of movie 'X' to communication device 104 in a format that is readable by that device.

However, if recognition system 308 is not able to match image 106 with any image in image database 108, it sends a signal to transaction interface 306 indicating that no match was found for image 106 in image database 108. In this event, transaction interface 306 sends a predefined response, such as a text message saying, "No information is available for the image sent by you", to communication device 104.

In accordance with an embodiment, the present invention can be used in collaboration with a movie studio. The movie studio can regularly update an image database with new images and content related to its latest movies without any human involvement. When a content delivery system receives an image related to a movie from the movie studio mentioned above, it matches the received image with the images updated by the movie studio and delivers the corresponding content to the communication device sending the image.

Similarly, the present invention can be used by publishing houses to deliver content about their books to the users of communication devices. The publishing houses can update the image database and content repository with the latest information about their books and authors of the books without any manual intervention. When a request is received at the content delivery system inquiring about a particular book or author, the content, such as new books by the author, plot of the story present in the book, etc., is directly delivered to the users of communication devices.

In accordance with another embodiment, the present invention can be used for a manufacturer of a new product, e.g., 'XY', who wants to promote the product (XY' through an interactive mobile promotion. In this case, the manufacturer can add images of the product 'XY' to an image database, and the corresponding promotional information to a content repository of a content delivery system. When the content delivery system receives an image of the product 'XY' from a communication device, it sends the corresponding promotional information to the communication device, thereby facilitating the process of promoting the product 'XY'.

Various embodiments of the present invention relate to a method and system for delivering content to a communication device in response to an image sent by the communication device. Such a method and system eliminate the need for any human involvement in updating the image database and content repository of a content delivery system delivering the content to the communication device. A content provider can directly update the image database and content repository without any human involvement or manual intervention, thereby saving human labor and the cost of continuously retraining the person involved in updating the image database and content repository. In other words, the present invention makes the process of maintaining and updating an image database and content repository much simpler and more efficient than in the case of current image databases and content repositories.

The system, as described in the present invention, or any of its components, may be embodied in the form of a computer system. Typical examples of a computer system include a general-purpose computer, a programmed microprocessor, a micro-controller, a peripheral integrated circuit element, and other devices or arrangements of devices that are capable of implementing the steps constituting the method of the present invention.

The computer system comprises a computer, an input device, a display unit and the Internet. The computer comprises a microprocessor, which is connected to a communication bus. The computer also includes a memory, which may include Random Access Memory (RAM) and Read Only Memory (ROM). Further, the computer system comprises a storage device, which can be a hard disk drive or a removable storage drive such as a floppy disk drive, an optical disk drive, and the like. Furthermore, the storage device can be other similar means for loading computer programs or other instructions on the computer system.

To process input data, the computer system executes a set of instructions that are stored in one or more storage elements. The storage elements may also hold data or other information, as desired, and may be an information source or physical memory element present in the processing machine.

The set of instructions may include various commands that instruct the processing machine to perform specific tasks such as the steps constituting the method of the present invention. The set of instructions may be in the form of a software program. The software may be in various forms such as system or application software. The software may also be in the form of a collection of separate programs, a program module with a larger program, or a portion of a program module. Moreover, the software may include modular programming in the form of object-oriented programming. Processing of input data by the processing machine may be in response to user commands, to the results of previous processing, or to a request made by another processing machine.

While the embodiments of the invention have been described, the invention is not limited to these embodiments only. A number of changes and modifications can be considered without moving away from the scope of the invention as set forth in the claims.

What is claimed is:

1. A computer system for delivering content to a communication device, the system comprising:
    a processor;
    a memory for storing instructions executable by the processor;
    an image database configured to store a plurality of images;
    a content repository configured to store content associated with the plurality of images stored in the image database;
    a database interface operable by the instructions executed on the processor to, at least:
    modify the content repository including at least one of creating a new content repository, adding new content to an existing content repository, and removing at least one content from the existing content repository;
    receive, from a content provider, at least one image, at least one piece of content and at least one rule mapping the at least one image to the at least one piece of content; and
    update the image database with the at least one image from the content provider, the content repository with the at least one piece of content from the content provider and a set of mapping rules with the at least one rule from the content provider;
    a transaction interface operable by the instructions executed on the processor at least to receive an image from a communication device and to send at least one content item corresponding to the image to the communication device; and a recognition component operable by the instructions executed on the processor to, at least:

receive the image from the transaction interface;

determine whether the received image matches any image of the plurality of images stored in the image database;

if a matching image is found, retrieve at least one content item associated with the matching image from the content repository in accordance with the set of mapping roles including the at least one rule from the content provider; and cause the transaction interface to send the retrieved at least one content item to the communication device.

2. The computer system of claim 1 wherein the transaction interface is further operable to determine, using a multimedia lookup table, a proper format for audio and video content based at least in part on a type of the communication device to which the at least one piece of content is sent.

3. The computer system of claim 1, wherein the communication device is configured to receive and transmit images and media content.

4. The computer system of claim 1, wherein the communication device is a wireless communication device.

5. The computer system of claim 1, wherein the communication device is configured to capture and transmit images.

6. The computer system of claim 5, wherein the captured and transmitted images include one of a product, a newspaper article, or a movie poster.

7. The computer system of claim 1, wherein the communication device comprises a personal computer.

8. A computer-implemented method for delivering content to a communication device, the method comprising:

under the control of one or more computer systems configured with executable instructions, modifying a content repository configured to store content associated with a plurality Of images stored in an image database, wherein modifying the content repository comprises at least one of creating a new content repository, adding new content to an existing content repository, and removing at least one content from the existing content repository;

receiving, from a content provider, at least one image, at least one piece of content and at least one rule mapping the at least one image to the at least one piece of content;

updating (i) the image database with the at least one image from the content provider, (ii) the content repository with the at least one piece of content from the content provider, and (iii) a set of mapping rules with the at least one rule from the content provider;

receiving an image from a communication device;

determining whether the received image matches any image of the plurality of images stored in the image database;

if a matching image is found, retrieving content associated with the matching image from the content repository in accordance with the set of mapping rules including the at least one rule from the content provider; and delivering the retrieved content to the communication device.

9. The computer-implemented method of claim 8 further comprising:

delivering a predefined response to the communication device when the received image does not match any image of the plurality of images.

10. The computer-implemented method of claim 8 further comprising specifying the content to be delivered corresponding to each of the plurality of images.

11. The computer-implemented method of claim 8 further comprising generating a transaction report corresponding to the plurality of images based on logging transaction information corresponding to the plurality of images.

12. The computer-implemented method of claim 8, further comprising modifying the image database, wherein modifying the image database comprises at least one of creating a new image database, adding a new image to an existing image database, or removing at least one image from the existing image database.

13. The computer-implemented method of (X) claim 8, further comprising defining rules mapping each image in the image database to the content stored in the content repository.

14. A computer-readable storage medium having computer-executable instructions embodied therein that, when executed on a computer, cause the computer to, at least:

modify a content repository configured to store content associated with a plurality of images stored in an image database, wherein modifying the content repository comprises at least one of creating a new content repository, adding new content to an existing content repository, and removing at least one content from the existing content repository;

receive, from a content provider, at least one image, at least one piece of content and at least one rule mapping the at least one image to the at least one piece of content;

update the image database with the at least one image from the content provider the content repository with the at least one piece of content from the content provider and a set of mapping rules with the at least one rule from the content provider; receive an image from a communication device;

determine whether the received image matches any image of the plurality of images stored in the image database;

if a matching image is found, retrieve content associated with the matching image from the content repository in accordance with the set of mapping rules including the at least one rule from the content provider; and deliver the retrieved content to the communication device.

15. The computer-readable storage medium of claim 14, wherein the computer-executable instructions further cause the computer to modify the image database.

16. The computer-readable storage medium of claim 14, wherein the computer-executable instructions further cause the computer to retrieve content associated with the matching image from a content repository.

17. The computer-readable storage medium of claim 14, wherein the computer-executable instructions further cause the computer to enable the content provider to define rules mapping at least one image in the image database to content in the content repository.

18. A computer implemented method comprising:

under the control of one or more computer systems configured with executable instructions, receiving, from a content provider, at least one image, at least one piece of content and at least one rule mapping the at least one image to the at least one piece of content;

updating an image database with the at least one image from the content provider, a content repository with the at least one piece of content from the content provider and a set of mapping rules with the at least one rule from the content provider;

receiving an image from a communication device;

determining whether the received image matches any image of a plurality of images stored in an the image database;

if a matching image is found, retrieving content associated with the matching image from the content repository in accordance with the set of mapping rules including the at least one rule from the content provider;

delivering the retrieved content to the communication device;

generating a transaction report corresponding to the plurality of images based at least in part on logging transaction information with respect to the plurality of images; and modifying the content repository, the content repository configured at least to store content associated with the plurality of images stored in the image database, wherein modifying the content repository comprises at least one of creating a new content repository, adding new content to the created content repository, and removing at least one piece of content from the created content repository.

19. The method of claim 18, wherein the matching image is different from the image received from the communication device.

20. The method of claim 18, wherein the content associated with the matching image in accordance with the set of mapping rules includes non-image content.

21. The method of claim 18, wherein the transaction report includes data with respect to how well received images matched the plurality of images in the image database.

22. The method of claim 18, wherein the image database is a new image database corresponding to the created content repository.

* * * * *

UNITED STATES PATENT AND TRADEMARK OFFICE
CERTIFICATE OF CORRECTION

PATENT NO. : 8,126,858 B1  
APPLICATION NO. : 12/284180  
DATED : February 28, 2012  
INVENTOR(S) : Mark A. Ruzon et al.

Page 1 of 1

It is certified that error appears in the above-identified patent and that said Letters Patent is hereby corrected as shown below:

Col. 10, Ln 11, Claim 13, please remove [(X)].

Signed and Sealed this
First Day of May, 2012

David J. Kappos
*Director of the United States Patent and Trademark Office*